(12) United States Patent
Sundaram et al.

(10) Patent No.: US 12,462,402 B2
(45) Date of Patent: Nov. 4, 2025

(54) METHOD, SYSTEM AND APPARATUS FOR MOBILE LOCATIONING

(71) Applicant: ZEBRA TECHNOLOGIES CORPORATION, Lincolnshire, IL (US)

(72) Inventors: Sundaresan Sundaram, Bangalore (IN); Alan J. Epshteyn, Mount Sinai, NY (US); Anup Kulkarni, Gulbarga (IN); Shruti Kulkarni, Bangalore (IN); Meena Avasarala, Bangalore (IN); Kaushik Samudrala, Kurnool (IN); Induja Seshagiri Babu, Bangalore (IN); Vaibhav Srinivasa, Bangalore (IN)

(73) Assignee: Zebra Technologies Corporation, Lincolnshire, IL (US)

( * ) Notice: Subject to any disclaimer, the term of this patent is extended or adjusted under 35 U.S.C. 154(b) by 31 days.

(21) Appl. No.: 16/776,054

(22) Filed: Jan. 29, 2020

(65) Prior Publication Data
US 2021/0233256 A1    Jul. 29, 2021

(51) Int. Cl.
*G06T 7/246*    (2017.01)
*G06K 7/10*    (2006.01)
(Continued)

(52) U.S. Cl.
CPC ............ *G06T 7/248* (2017.01); *G06K 7/1417* (2013.01); *G06T 7/74* (2017.01); *G06K 2007/10524* (2013.01); *G06T 2207/30204* (2013.01)

(58) Field of Classification Search
CPC . G06T 7/248; G06T 7/74; G06T 2207/30204; G06T 7/246;
(Continued)

(56) References Cited

U.S. PATENT DOCUMENTS 9,595,109 B1 *    3/2017    Umakhanov ............ G06T 7/73
2019/0073550 A1    3/2019    Obotnine
(Continued)

FOREIGN PATENT DOCUMENTS

GB    2599091 A *    3/2022    ........... G06K 7/1426

OTHER PUBLICATIONS

International Search Report and Written Opinion for International Application No. PCT/US2021/15821 mailed on Apr. 8, 2021.
(Continued)

*Primary Examiner* — Matthew Mikels (57) ABSTRACT

A computing device includes: a tracking assembly including a camera; a data capture module; and a controller connected with the tracking assembly and the data capture module, the controller configured to: control the tracking assembly to track successive poses of the computing device in a first frame of reference; control the data capture module to capture and decode an indicium placed in a facility; obtain, based on the indicium, a position of a point in the facility in a second frame of reference corresponding to the facility; detect, via the camera, features of a marker placed in the facility; determine, based on the detected features, an orientation of the marker in the second frame of reference; and generate, for each pose in the first frame of reference, a corresponding pose in the second frame of reference according to the position of the point and the orientation.

18 Claims, 8 Drawing Sheets

(51) Int. Cl.
  *G06K 7/14* (2006.01)
  *G06T 7/73* (2017.01)
(58) Field of Classification Search
  CPC ........ G06T 2207/30244; G06K 7/1417; G06K 2007/10524; G06K 7/10722; H04W 4/029
  See application file for complete search history.

(56) References Cited

U.S. PATENT DOCUMENTS

2019/0156086 A1    5/2019  Plummer et al.
2019/0171780 A1*   6/2019  Santarone .......... G02B 27/0093

OTHER PUBLICATIONS

Anwar Qaiser et al: "Design of coded reference labels for indoor optical navigation using monocular camera", International Conference of Indoor Positioning and Indoor Navigation, IEEE, Oct. 28, 2013 (Oct. 28, 2013), bladzijden 1-8, XP032595679.
Novelty Search Report for Belgian Patent Application No. 2021/5049 mailed on Oct. 16, 2021.

* cited by examiner

METHOD, SYSTEM AND APPARATUS FOR MOBILE LOCATIONING

BACKGROUND

Tracking locations of mobile computing devices within facilities or other operating environments may be used to deliver specific content (e.g. location-specific tasks) to the devices, for device fleet management activities, and the like. In some environments, however, certain locationing technologies may be unavailable or provide insufficient locationing accuracy.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a computing device including: a tracking assembly including a camera; a data capture module; and a controller connected with the tracking assembly and the data capture module, the controller configured to: control the tracking assembly to track successive poses of the computing device in a first frame of reference; control the data capture module to capture and decode an indicium placed in a facility; obtain, based on the indicium, a position of a point in the facility in a second frame of reference corresponding to the facility; detect, via the camera, features of a marker placed in the facility; determine, based on the detected features, an orientation of the marker in the second frame of reference; and generate, for each pose in the first frame of reference, a corresponding pose in the second frame of reference according to the position of the point and the orientation.

Additional examples disclosed herein are directed to a method, including: controlling a tracking assembly of the computing device to track successive poses of the computing device in a first frame of reference; controlling a data capture module of the computing device to capture and decode an indicium placed in a facility; obtaining, based on the indicium, a position of a point in the facility in a second frame of reference corresponding to the facility; detecting, via a camera of the computing device, features of a marker placed in the facility; determining, based on the detected features, an orientation of the marker in the second frame of reference; and generating, for each pose in the first frame of reference, a corresponding pose in the second frame of reference according to the position of the point and the orientation.

Figure 1:
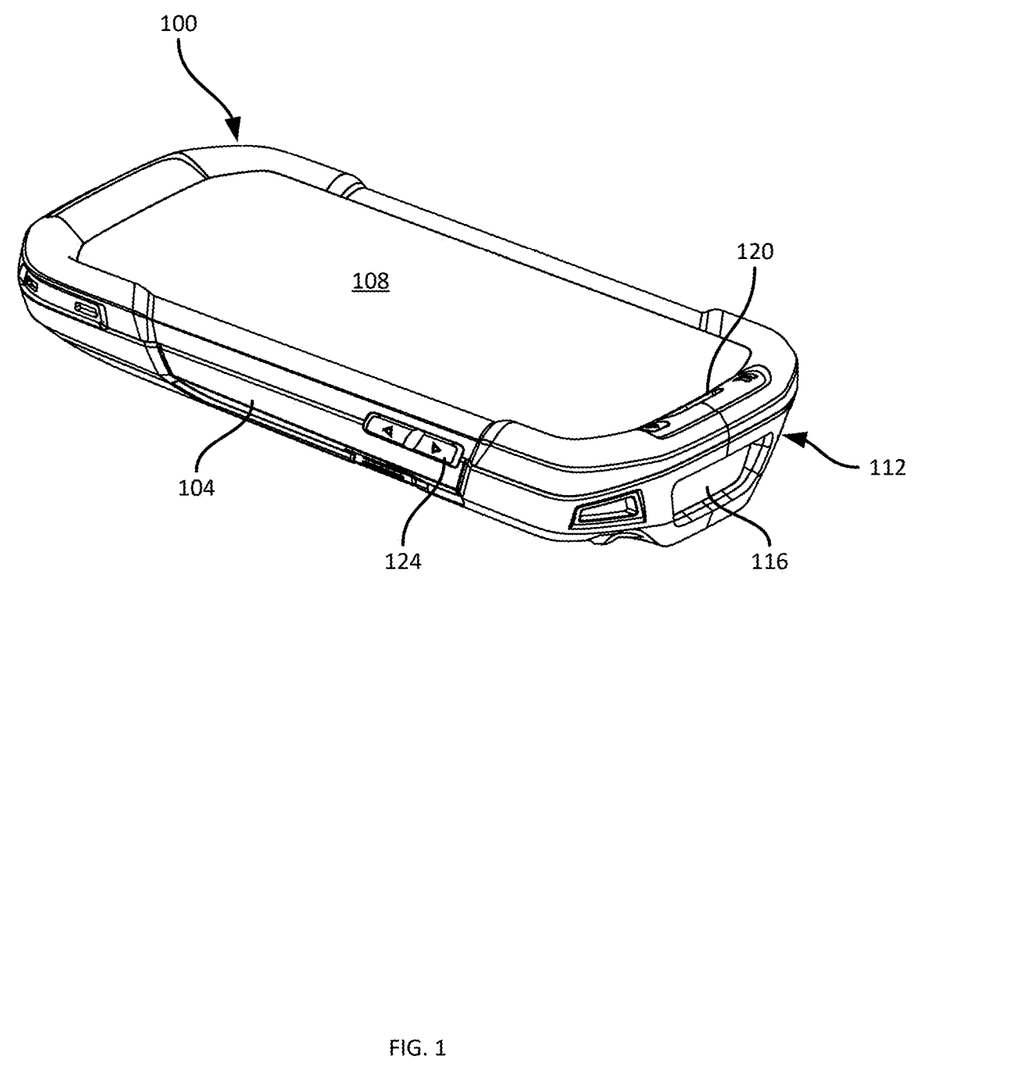
FIG. 1 is a diagram illustrating a mobile computing device.

FIG. 1 illustrates a mobile computing device 100 (also referred to herein as the mobile device 100 or simply the device 100) that is enabled to track its location within a facility, such as a warehouse or other operating environment. The facility may be constructed such that locationing technologies such as the Global Positioning System (GPS) are unavailable or insufficiently accurate. The device 100, instead, employs a combination of local pose tracking and facility infrastructure to track a pose (i.e. position and orientation) of the device 100 according to a frame of reference previously established within the facility.

The device 100 includes a housing 104 supporting various other components of the device 100. Among the components supported by the housing 104 are a display 108 which can also include an integrated touch screen, as well as a data capture module 112, such as a barcode scanner. As seen in FIG. 1, the data capture module 112 includes a scan window 116 through which the module 112 can capture images and/or emit laser beams to detect and decode indicia such as barcodes affixed to objects within the above-mentioned facility. The device 100 can also include other output devices, such as a speaker 120. The device 100 can also include other input devices, including any one or more of a microphone, a least one button, a trigger, and the like. Such input devices are indicated as an input assembly 124 in FIG. 1 (including buttons on a side of the housing 104).

Figure 2:
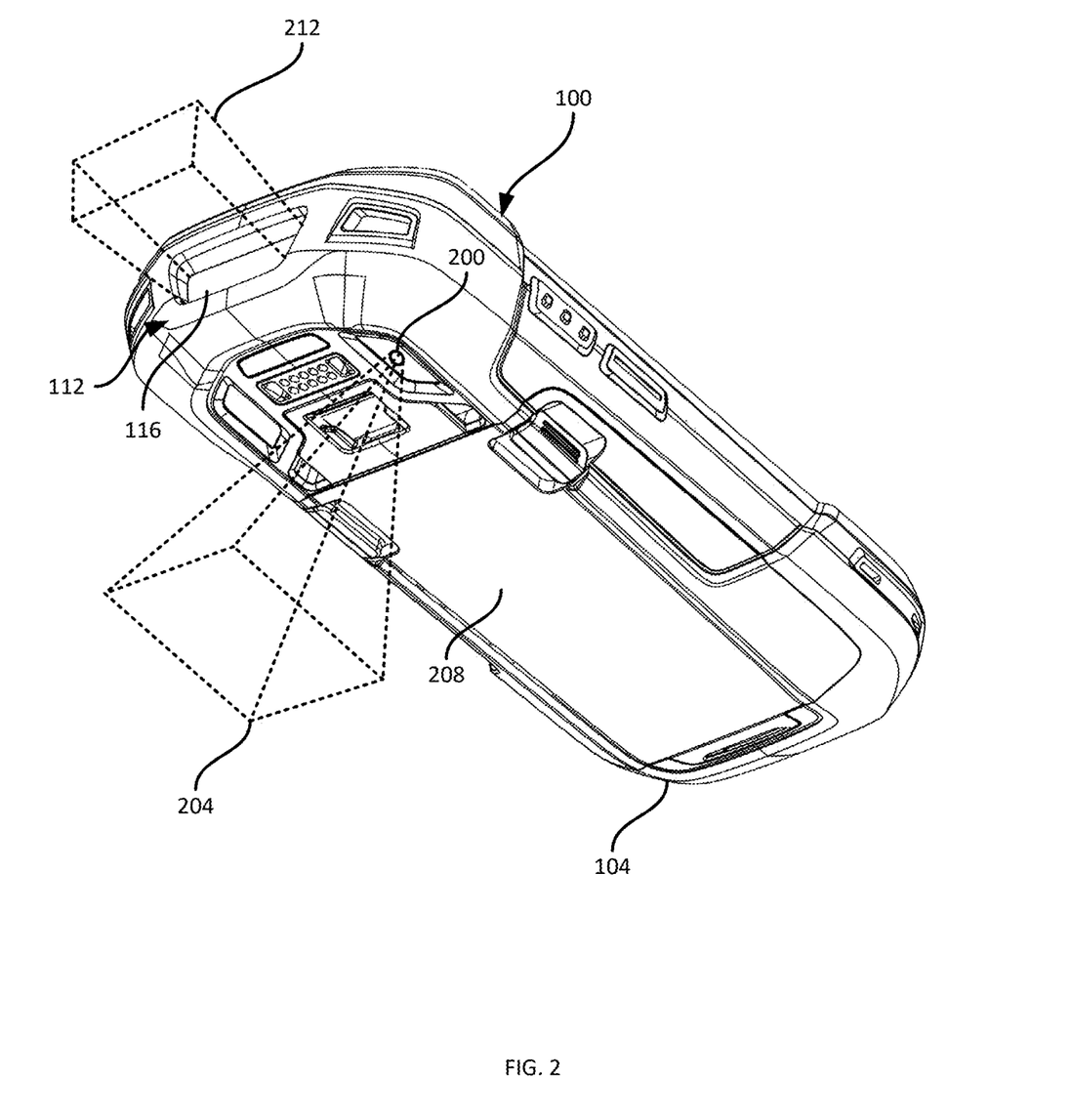
FIG. 2 is a diagram illustrating a rear view of the mobile computing device of FIG. 1.

Turning to FIG. 2, which illustrates a rear view of the device 100, the device 100 also includes a camera 200 including a suitable image sensor or combination of image sensors. The camera 200 is controllable to capture a sequence of images (e.g. a video stream) for provision subsequent processing. The camera 200 has a field of view (FOV) 204 extending away from a back surface 208 of the device 100 (opposite the display 108). The FOV 204, in the illustrated example, is substantially perpendicular to the back surface 208. As also illustrated in FIG. 2, the data capture module 112 also has a FOV 212, extending from the scan window 116 and substantially perpendicular to the FOV 204.

As will be discussed below, data captured using the data capture module 112, and images captured using the camera 200, are employed to track a pose of the device 100 within the above-mentioned facility. In particular, images captured via the camera 200, in conjunction with other motion sensing data, e.g. from an inertial measurement unit (IMU) of the device 100, are employed to track successive poses of the device 100 according to a first frame of reference. The first frame of reference, however, is defined arbitrarily, and may not correspond to a second frame of reference previously established in the facility. The device 100 is therefore configured to also employ data obtained via the data capture module 112 to determine a transform (e.g. a function combining a translation and a rotation) between the first and second frames of reference. The transform, once generated, enables the device to perform pose tracking in the first frame of reference, and convert poses obtained thereby into the second frame of reference. Before further discussing the functionality implemented by the device 100, certain components of the device 100 will be described, with reference to FIG. 3.

Figure 3:
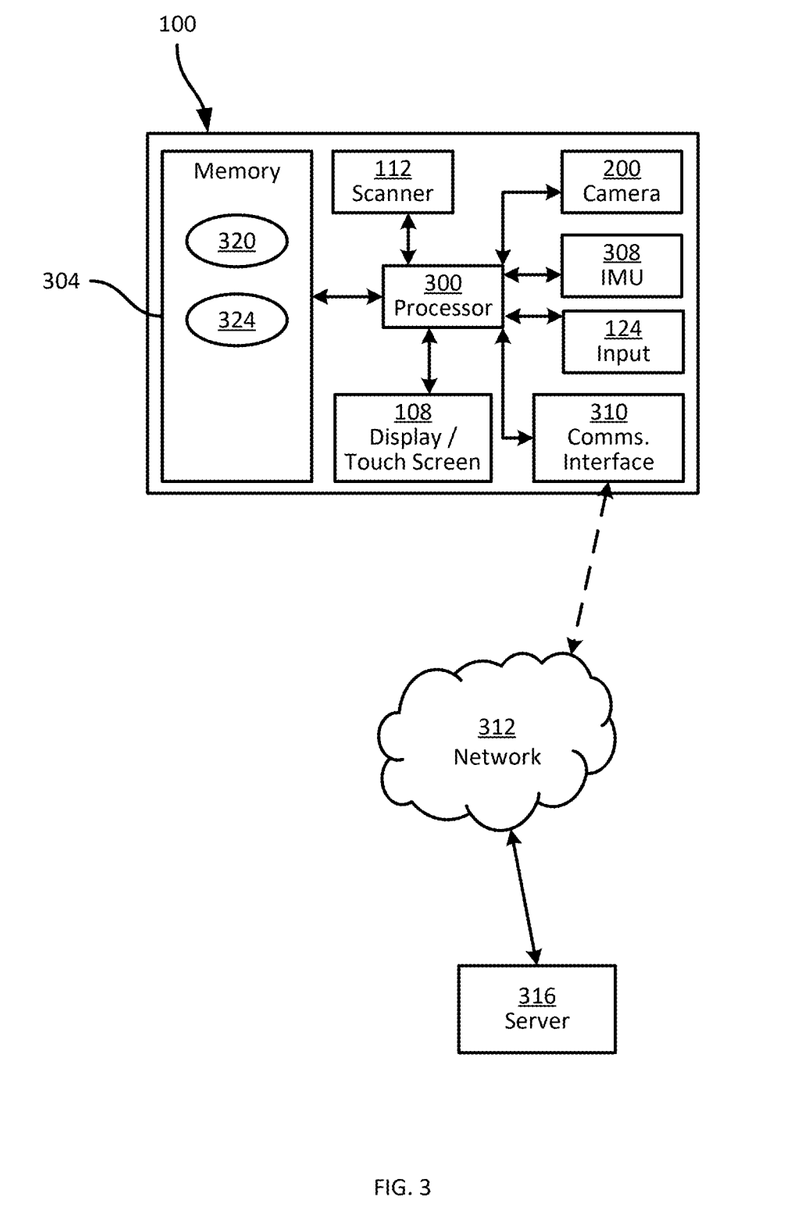
FIG. 3 is a block diagram of certain internal hardware components of the mobile computing device of FIG. 1.

Referring to FIG. 3, a block diagram of certain components of the device 100 is illustrated. In addition to the display and touch screen 108, the data capture module 112, and the input assembly 124, the device 100 includes a special-purpose controller, such as a processor 300, interconnected with a non-transitory computer readable storage medium, such as a memory 304. The memory 304 includes a combination of volatile memory (e.g. Random Access Memory or RAM) and non-volatile memory (e.g. read only memory or ROM, Electrically Erasable Programmable Read Only Memory or EEPROM, flash memory). The processor 300 and the memory 304 each comprise one or more integrated circuits.

The device 100 also includes a motion sensor such as an inertial measurement unit (IMU) 308 including one or more accelerometers, one or more gyroscopes, and/or one or more magnetometers. The IMU 308 is configured to generate data indicating detected movement of the device 100 and provide the data to the processor 300. The processor 300 can be configured to process the motion data from the IMU 308 along with images from the camera 200 to track a current pose of the device 100 in the above-mentioned first frame of reference. The camera 200 and the IMU 308 may therefore also be referred to as a tracking assembly.

As will be apparent to those skilled in the art, other combinations of image sensors and/or motion sensors can be employed to implement a tracking assembly. For example, a tracking assembly can be implemented with one or more of an ultra-wideband sensor, a lidar sensor, an ultrasonic sensor, or the like.

The device 100 also includes a communications interface 310 enabling the device 100 to exchange data with other computing devices, e.g. via a network 312. The other computing devices can include a server 316, which may be deployed within the facility, or remotely from the facility.

The memory 304 stores computer readable instructions for execution by the processor 300. In particular, the memory 304 stores a pose tracking application 320 which, when executed by the processor 300, configures the processor 300 to track a sequence of poses of the device 100 based on data from the IMU 308 and the camera 200, as mentioned above. The poses generated via execution of the application 320 are in the first frame of reference, which may arbitrarily defined by the application 320.

The memory 304 also stores a location manager application 324. Execution of the application 324 configures the processor 300 to use data from the camera 200 and the data capture module 112 to convert poses generated by the application 320 (i.e. poses in the first frame of reference) into poses in the second frame of reference, which may be a predefined frame of reference corresponding to the facility, rather than an arbitrary and transient (e.g. session-specific) frame of reference like the first frame of reference employed by the application 320. Each of the applications 320 and 324 may also be implemented as a suite of distinct applications in other examples. In further examples, the applications 320 and 324 may be combined into a single application.

The processor 300, when so configured by the execution of the applications 320 and 324, may also be referred to as a locationing controller, or simply a controller. Those skilled in the art will appreciate that the functionality implemented by the processor 300 via the execution of the applications 320 and 324 may also be implemented by one or more specially designed hardware and firmware components, such as FPGAs, ASICs and the like in other embodiments.

Figure 4:
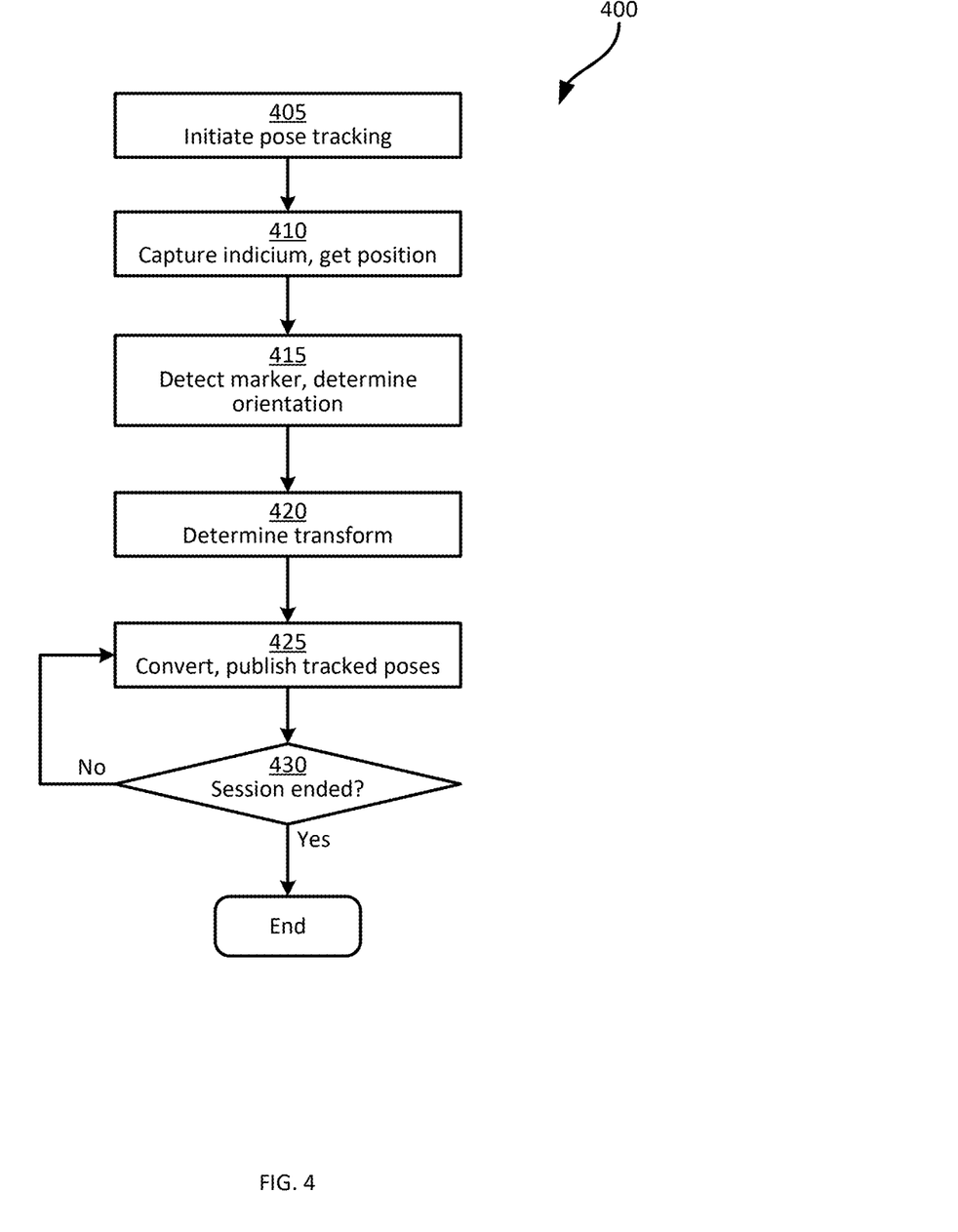
FIG. 4 is a flowchart of a locationing method.

Turning now to FIG. 4, the functionality implemented by the device 100 will be discussed in greater detail. FIG. 4 illustrates a locationing method 400, which will be discussed below in conjunction with its performance by the device 100.

At block 405, the device 100 initiates pose tracking. That is, the device 100 begins tracking successive poses (i.e. positions and orientations of the device 100 in three dimensions), at any suitable frequency (e.g. at a frequency of about 30 or 60 Hz, although a wide variety of other pose estimation frequencies can also be employed). The frequency with which pose estimates are generated by the device 100 may depend, for example, on the frame rate of the camera 200 and/or the sampling frequency of the IMU 308. Pose tracking can be initiated responsive to receiving an input command, e.g. from the operator of the device 100, via the input assembly 124.

To track the pose of the device 100, the processor 300 controls the tracking assembly (e.g. the camera 200 and the IMU 308) to capture data representing the surroundings of the device 100, as well as motion of the device 100. In the present example, the processor 300 controls the camera 200 to begin capturing a stream of images and providing the images to the processor 300. The processor 300 also controls the IMU 308 to provide motion data (e.g. defining accelerations affecting the device 100, as well as changes in orientation of the device 100). The processor 300 detects at least one image features in the images from the camera 200, and tracks the changes in position of such features between images. Examples of features include corners, edges (e.g. changes in gradient) and the like, detectable via any suitable feature-detection algorithms. The movement of such features between images is indicative of movement of the device 100.

The positions of the above-mentioned image features, as well as motion data from the IMU 308, can be provided as inputs to a pose estimator implemented by the processor 300, such as a Kalman filter. Various mechanisms will occur to those skilled in the art to combine image and/or motion sensor data to generate pose estimations. Examples of such mechanisms include those implemented by the ARCore software development kit provided by Google LLC, and the ARKit software development kit provided by Apple Inc. In other words, the application 320 shown in FIG. 3 can implement the above functionality.

Figure 5:
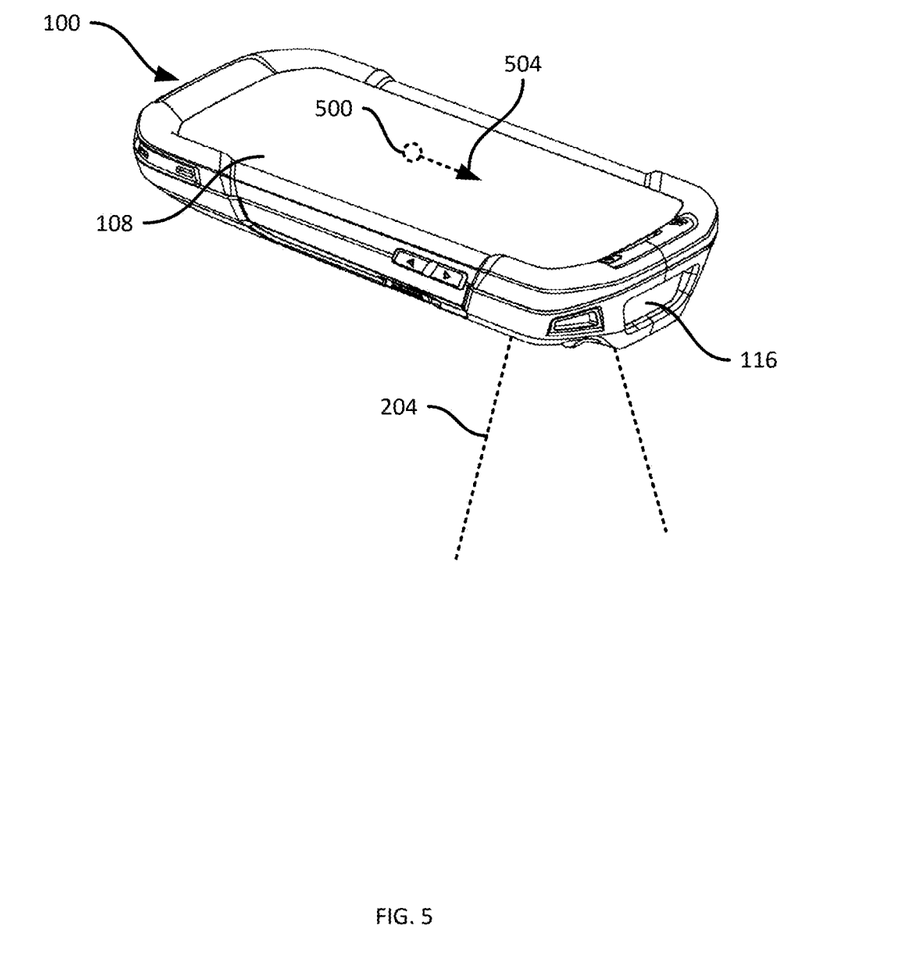
FIG. 5 is a diagram illustrating a performance of block 405 of the method of FIG. 4.

Turning to FIG. 5, an example pose estimate is illustrated as determined at block 405, including a position 500 and an orientation 504. The position 500 represents the location of a reference point on the device 100, such as a centroid of the device 100. In other embodiments, the position 500 can correspond to a different point of the device 100 (e.g. a center of a lens assembly of the camera 200). The orientation 504 represents the direction in which the front of the device 100 (e.g. the forward surface, bearing the scan window 116) is currently facing. The position 500 and orientation 504 are defined relative to a three-dimensional frame of reference. In particular, the position 500 and orientation 504 are defined according to a first frame of reference that is generated arbitrarily by the device 100 when the performance of block 405 begins.

Figure 6:
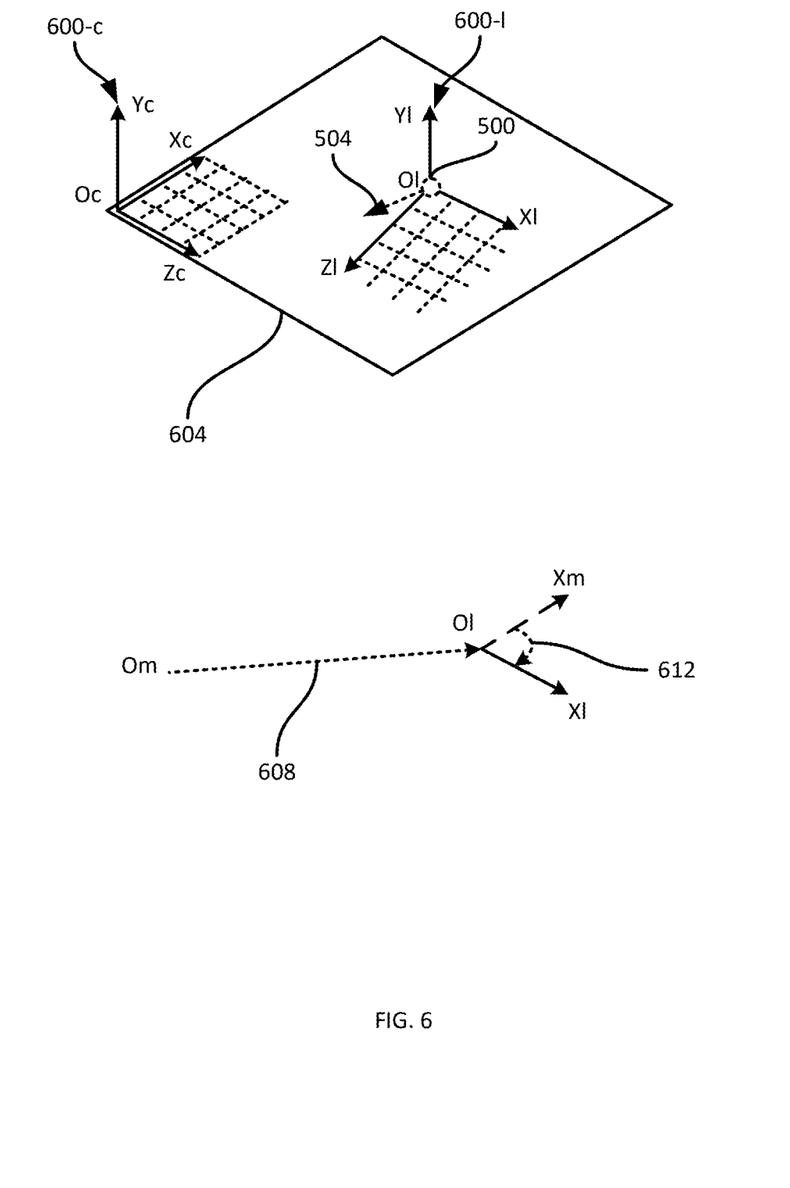
FIG. 6 is a further diagram illustrating the performance of block 405 of the method of FIG. 4

Turning to FIG. 6, an example first frame of reference 600-1 is illustrated as mentioned above. The frame of reference 600-1 may also be referred to as a local frame of reference, identified by the suffix "1", due to the arbitrary and session-specific nature of the frame of reference 600-1. As seen in FIG. 6, the position 500 is at an origin Ol of the frame of reference 600-1, for example because the frame of reference 600-1 was initialized at the current position of the device 100 when performance of the method 400 began.

The position 500 is defined by coordinates along each of three axes Xl, Yl and Zl of the frame of reference 600-1, and the orientation 504 is defined by angles in each of three planes formed by the above-mentioned axes. For example, the orientation 504 can be defined by a pitch angle in the Xl-Yl plane, a roll angle in the Yl-Zl plane, and a yaw angle in the Xl-Zl plane. For example, the pose consisting of the position 500 and the orientation 504 may be defined by the following triplets of X, Y and Z coordinates and roll, pitch and yaw angles: [0, 0, 0] and [0°, −15°, −30°].

Also shown in FIG. 6 is a frame of reference 600-c, previously established at the facility mentioned above and defined by an origin Oc and axes Xc, Yc and Zc. A floor plan 604 of the facility is also shown, indicating the locations of the origins Ol and Oc of the frames of reference 600, as well as the physical location of the device 100 (via the position 500 and orientation 504). The frame of reference 600-c employs the suffix "c" indicating that the frame of reference 600-c defines a common frame of reference that may also be referred to as a world frame of reference, a map frame of reference, or the like. In general, the device 100 and other computing devices (e.g. the server 316) employ the frame of reference 600-c to indicate locations of tasks to be performed, to determine data to be sent to devices 100, and the like.

As is evident from FIG. 6, although the Y axes Yc and Yl of the frames of reference 600 are parallel, the origins Oc and Ol do not coincide, and the X and Z axes of the frames of reference 600 are at different angles from one another. Because the frame of reference 600-c is substantially constant while the frame of reference 600-1 is generated dynamically by the device 100, the coordinates and angles defining the position 500 and orientation 504 as obtained at block 405 may not be usable by other devices (e.g. the server 316). The device 100 is therefore configured to perform additional actions to convert tracked poses in the frame of reference 600-1 into poses defined in the frame of reference 600-c.

More specifically, as will be discussed below, the device 100 is configured to determine a translational adjustment 608 between the origins Oc and Ol, and a yaw adjustment 612 between the axes Xl and Xc. The adjustments 608 and 612 can then be stored and applied to future poses generated via the application 320 to convert such poses to representations in the common frame of reference 600-c. The remainder of the method 400, which may be performed via execution of the application 324, serves to generate the above-mentioned adjustments 608 and 612.

Returning to FIG. 4, once pose tracking is initiated at block 405, pose tracking is performed continuously throughout the remainder of the method 400. That is, the device 100 generates a stream of poses in the local frame of reference 600-1. At block 410, while pose tracking continues, the device 100 is configured to capture and decode an indicium such as a barcode that is within the FOV 212 of the data capture module 112. Various forms of indicia are contemplated, including one and two-dimensional barcodes. Responsive to capturing and decoding the indicium, the device 100 is configured to obtain a position in the common frame of reference 600-c. The position obtained at block 410 is used subsequently to determine the translation adjustment 608 mentioned above. The indicium is affixed to any suitable surface within the facility, e.g. a wall or the like, and the position mentioned above corresponds to the position of the indicium itself, or of an associated infrastructural component nearby, as discussed below.

Capturing the indicium at block 410 can be performed in response to activation of the input assembly 124 (e.g. a trigger, a button) or another suitable input device, such as the touch screen integrated with the display 108. The above-mentioned position can be obtained by various mechanisms. For example, the indicium itself may encode the position, for example as a triplet of coordinates defining the position in the frame of reference 600-c. In other examples, the indicium can encode an identifier specific to that indicium (e.g. when the facility includes multiple such indicia), and the position obtained at block 410 can be requested from the server 136. That is, the device 100 can transmit a request to the server 136 containing the identifier decoded from the indicium, and the server 136 can return the position. A combination of the above mechanisms may also be employed, in which the indicium encodes at least a portion of the information defining the position, as well as an identifier that can be used to request information from the server 136.

At block 415, the device 100 is configured to detect image features corresponding to a fiducial marker placed in the facility. The marker can be painted, labelled or the like, in the vicinity of the indicium captured at block 410. More specifically, the marker is placed such that when the indicium is within the FOV 212, the marker is within the FOV 204 of the camera 200. In other words, the indicium and the marker are placed within the facility such that blocks 410 and 415 can be performed substantially simultaneously.

The performance of block 415 can be initiated by the same input (e.g. a trigger press, as mentioned above) as is used to initiate the performance of block 410. At block 415, the processor (as configured via execution of the application 324) obtains a frame captured by the camera 200, and searches the frame for predefined image features corresponding to the shape of the marker. A wide variety of marker shapes and features are contemplated. The performance of block 415 may include, in some examples, retrieving a reference image of the marker from the memory 304 and comparing the above-mentioned frame with the reference image.

Figure 7:
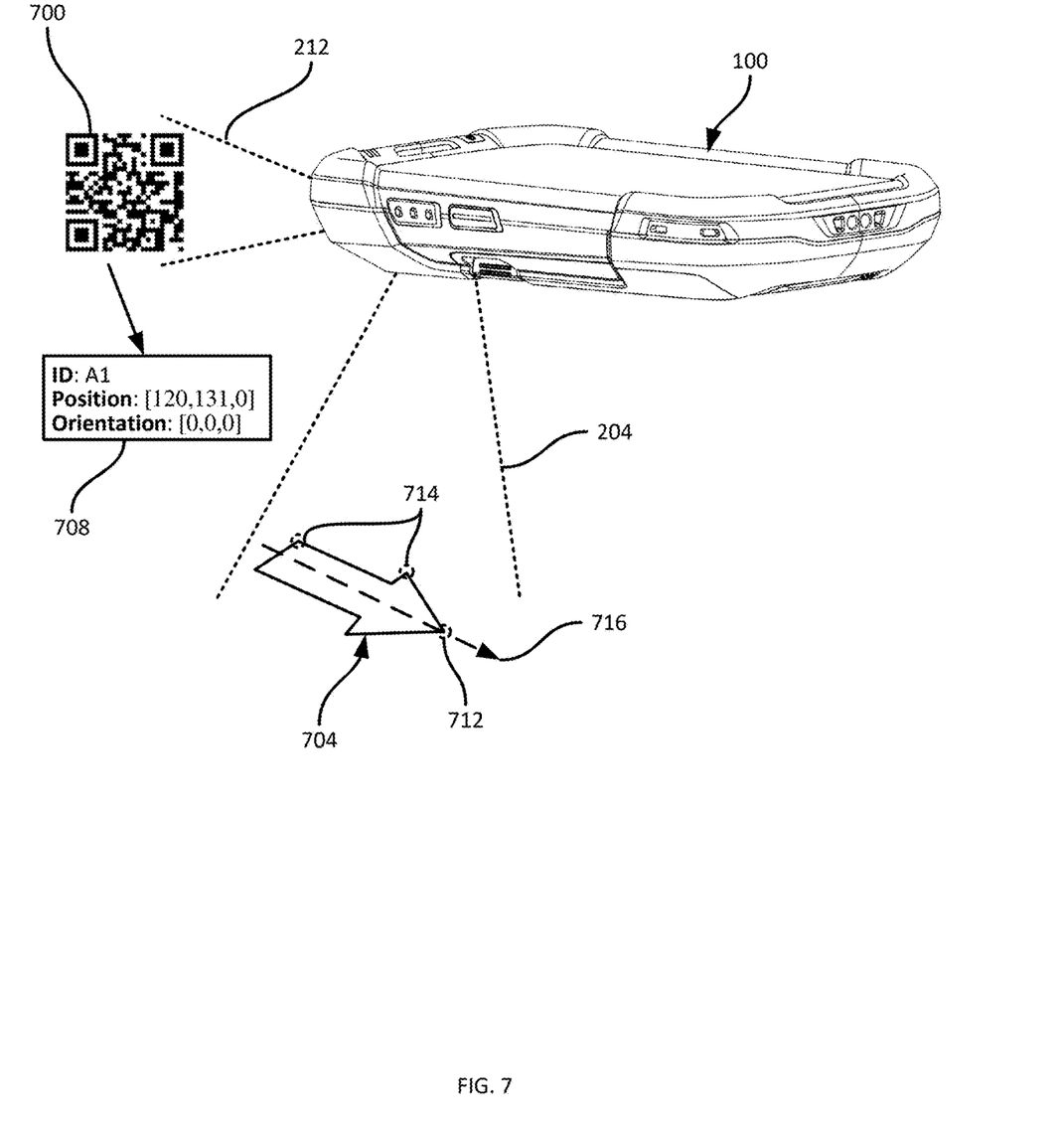
FIG. 7 is a diagram illustrating a performance of blocks 410 and 415 of the method of FIG. 4.

Turning to FIG. 7, an example performance of blocks 410 and 415 is illustrated. In particular, an example indicium 700 (a QR code, in the present example) is shown, e.g. affixed to a wall or other suitable surface. In addition, a marker 704 is shown, e.g. affixed to a floor or other suitable surface. The placement of the indicium 700 and marker 704 are such that the indicium 700 can be placed within the FOV 212 simultaneously with the marker 704 being placed within the FOV 204.

Upon activation of an input such as a trigger, button or the like, the device 100 captures the indicium 700, and also captures an image via the camera 200. Because the camera 200 is controlled to capture a continuous stream of images for the pose tracking initiated at block 405, the performance of block 415 can include simply retrieving a frame from the stream that coincides in time with the activation of the input mentioned above.

At block 410, positional information 708 is decoded from the indicium 700. As illustrated, the indicium 700 encodes both positional information and an identifier "A1" that can be employed to request the positional information from the server 136. In addition to a position [120, 131, 0], the indicium encodes an orientation of [0, 0, 0]. The position and orientation correspond to the marker 704. Specifically, the position encoded in the indicium 700 (or retrieved from the server 136 based on the indicium 700) is the position in the frame of reference 600-c of a predefined feature of the marker 704, such as the point 712 of the arrow. The point 712 of the marker 704, as well as other features (e.g. corners 714) are identified in the image from the camera 200 to detect the marker 704.

The orientation encoded in the indicium 700, meanwhile, indicates the orientation of a longitudinal axis 716 of the marker 704. In the present example, the indicium 700 indicates that the axis 716 is parallel to the axis Xc (i.e. roll, pitch and yaw angles are all zero degrees).

Having performed blocks 410 and 415, therefore, the device 100 obtains a position and an orientation corresponding to the marker 704, in the frame of reference 600-c. Returning to FIG. 4, at block 420 the device 100 is configured to determine a transform between the frames of reference 600-c and 600-1 using the position and orientation obtained at blocks 410 and 415 (e.g. the position of the point 712, and the orientation of the axis 716).

At block 420, the device 100 also uses the position and orientation of the marker 704 in the local frame of reference 600-1, which are available as a result of the pose tracking activity performed throughout the performance of the method 400. At block 420, therefore, the device 100 determines a difference between the position of the point 712 as expressed in the frame of reference 600-1, and the position of the point 712 as expressed in the frame of reference 600-c. That difference is the translation adjustment 608 shown in FIG. 6.

In addition, the device 100 determines a difference between the orientation of the axis 716 as expressed in the frame of reference 600-1, and the orientation of the axis 716 as expressed in the frame of reference 600-c. That difference is the yaw adjustment 612 shown in FIG. 6. As will be apparent from FIG. 6, the axes Yc and Yl are parallel, and no adjustments are therefore needed for pitch and roll angles in the present embodiment. In other examples, however, the frame of reference 600-1 may also have a different pitch and roll than the frame of reference 600-c. In such examples, the device 100 is configured to determine the orientations of at least two features of the marker 704, such as the axis 716 and a transverse axis that is substantially perpendicular to the axis 716.

At block 425, having determined the transform (defined by the adjustments 608 and 612), the device 100 converts and publishes at least a subset of the tracked poses generated via the performance of block 405. That is, for at least the above-mentioned subset, the device 100 converts a tracked pose from the frame of reference 600-1 to the frame of reference 600-c, by applying the transform consisting of the adjustments 608 and 612 to the tracked pose.

In some examples, the device 100 converts every tracked pose generated via block 405. In other examples, the device 100 converts tracked poses at a configurable frequency, such as once per second. The device 100 also publishes the converted tracked poses. Publication can be accomplished via transmission to other local applications executed by the device 100, transmission to the server 136, or a combination thereof. The processor 300 can also control the display 108 to render successive converted tracked poses thereon.

At block 430, the device 100 determines whether the tracking session has ended. Tracking may be terminated by an explicit input (e.g. a command received via the display/touch screen 108). In other examples, tracking may be terminated if the local pose tracking process initiated at block 405 suffers a reduction in accuracy resulting in a discontinuity in pose tracking. In such instances, the frame of reference 600-1 may be discarded, and replaced with a new local frame of reference. When the determination at block 430 is affirmative, the current performance of the method 400 ends, and a new performance may be initiated. When the determination at block 430 is negative, pose tracking and conversion as described above continue.

Figure 8:
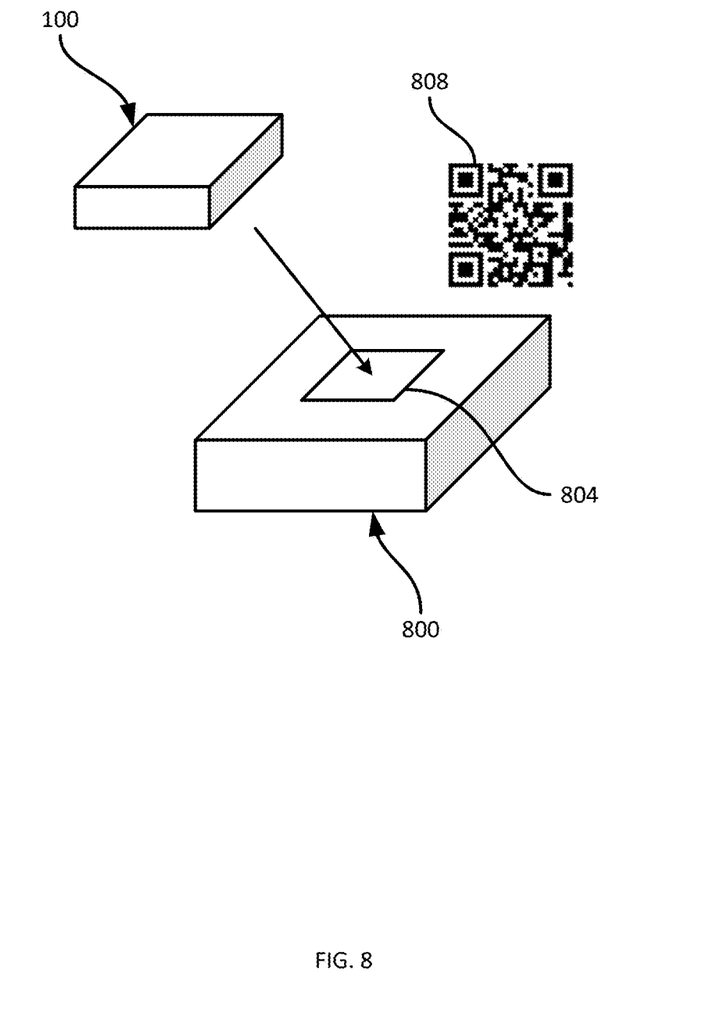
FIG. 8 is a diagram illustrating a further locationing mechanism employed by the mobile computing device of FIG. 1.

In another example, referring to FIG. 8, in some embodiments the marker 704 may be omitted, and a cradle or other physical support 800 may be deployed within the facility. The cradle 800 includes a designated receptacle 804 for receiving the device 100 and fixing the position of the device 100. When positioned on the receptacle 804, the device 100 is oriented such that an indicium 808 is within the field of view 212 of the data capture module 112. Thus, the indicium 808 can encode a position and orientation of the device 100 itself in the frame of reference 600-c. The device 100 can therefore determine the transform from its current tracked pose in the local frame of reference 600-1, and its current pose in the common frame of reference 600-c, as obtained from the indicium 808.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device, comprising:
    a tracking assembly including a camera;
    a data capture module; and
    a controller connected with the tracking assembly and the data capture module, the controller configured to:
        control the tracking assembly to track successive poses of the computing device in a first frame of reference within a facility;
        control the data capture module to capture and decode an indicium placed in the facility;
        obtain, based on the indicium, a position of a point of a marker, disposed in the facility, in a second frame of reference corresponding to the facility;
        detect, via a field of view of the camera, simultaneously with capturing and decoding the indicium via a field of view of the data capture module, features of a marker placed in the facility;
        determine, based on the detected features of the marker, an orientation of the marker in the second frame of reference; and
        generate, for each pose in the first frame of reference, a corresponding pose in the second frame of reference according to the position of the point and the orientation of the marker.

2. The computing device of claim 1, wherein the controller is further configured to:
    generate a transform between the first frame of reference and the second frame of reference based on the position of the point and the orientation;
    generate the corresponding pose in the second frame of reference according to the transform; and
    publish the corresponding pose in the second frame of reference.

3. The computing device of claim 2, wherein the controller is further configured, in order to publish the corresponding pose, to transmit the corresponding pose to a server.

4. The computing device of claim 1, wherein the processor is further configured, prior to tracking the successive poses, to establish the first frame of reference.

5. The computing device of claim 1, further comprising an input assembly; wherein the processor is configured to control the data capture module to capture and decode the indicium in response to an activation of the input assembly.

6. The computing device of claim 5, further comprising a memory storing a reference image of the marker; wherein the processor is further configured, in order to detect the features of the marker, to compare an image captured using the camera with the reference image.

7. The computing device of claim 1, wherein the point in the facility is one of the features of the marker.

8. The computing device of claim 1, wherein the processor is further configured to obtain, based on the indicium, the orientation in the second frame of reference.

9. The computing device of claim 1, wherein the processor is further configured, responsive to capturing the indicium, to:
    obtain an identifier from the indicium;
    transmit a request to a server containing the identifier; and
    receive, from the server, the position in the second frame of reference.

10. A method, comprising:
    controlling a tracking assembly of the computing device to track successive poses of the computing device in a first frame of reference in a facility;
    controlling a data capture module of the computing device to capture and decode an indicium placed in a facility;
    obtaining, based on the indicium, a position of a point of a marker, disposed in the facility, in a second frame of reference corresponding to the facility;
    detecting, via field of view of a camera of the computing device, simultaneously with capturing and decoding the indicium via a field of view of the data capture module, features of a marker placed in the facility;

determining, based on the detected features of the marker, an orientation of the marker in the second frame of reference; and generating, for each pose in the first frame of reference, a corresponding pose in the second frame of reference according to the position of the point and the orientation of the marker.

11. The method of claim 10, further comprising:

generating a transform between the first frame of reference and the second frame of reference based on the position of the point and the orientation;

generating the corresponding pose in the second frame of reference according to the transform; and publishing the corresponding pose in the second frame of reference.

12. The method of claim 11, wherein publishing the corresponding pose includes transmitting the corresponding pose to a server.

13. The method of claim 10, further comprising, prior to tracking the successive poses, establishing the first frame of reference.

14. The method of claim 10, further comprising detecting activation of an input assembly, and controlling the data capture module to capture and decode the indicium in response to detecting the activation.

15. The method of claim 14, further comprising:

storing a reference image of the marker;

wherein detecting the features of the marker comprises comparing an image captured using the camera with the reference image.

16. The method of claim 10, wherein the point in the facility is one of the features of the marker.

17. The method of claim 10, further comprising obtaining, based on the indicium, the orientation in the second frame of reference.

18. The method of claim 10, further comprising, responsive to capturing the indicium:

obtaining an identifier from the indicium;

transmitting a request to a server containing the identifier; and receiving, from the server, the position in the second frame of reference.

* * * * *